United States Patent
Wolf et al.

(10) Patent No.: US 9,304,888 B2
(45) Date of Patent: Apr. 5, 2016

(54) CONSISTENT MODELING AND EXECUTION OF TIME CONSTRUCTS IN BUSINESS PROCESSES

(71) Applicant: Microsoft Technology Licensing, LLC, Redmond, WA (US)

(72) Inventors: Kenneth David Wolf, Seattle, WA (US); Justin David Brown, Seattle, WA (US); Edmund Samuel Victor Pinto, Duvall, WA (US); Nathan Christopher Talbert, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 307 days.

(21) Appl. No.: 13/926,372

(22) Filed: Jun. 25, 2013

(65) Prior Publication Data

US 2014/0380323 A1 Dec. 25, 2014

(51) Int. Cl.
| | |
|---|---|
| *G06F 9/455* | (2006.01) |
| *G06F 1/04* | (2006.01) |
| *G06Q 10/00* | (2012.01) |
| *G06F 11/34* | (2006.01) |
| *G06Q 10/06* | (2012.01) |
| *G06F 9/48* | (2006.01) |

(52) U.S. Cl.
CPC .............. *G06F 11/34* (2013.01); *G06F 9/4843* (2013.01); *G06Q 10/06* (2013.01)

(58) Field of Classification Search
None
See application file for complete search history.

(56) References Cited

U.S. PATENT DOCUMENTS

| | | | |
|---|---|---|---|
| 2002/0161688 A1 | 10/2002 | Stewart et al. | |
| 2003/0195789 A1 | 10/2003 | Yen | |
| 2006/0020948 A1 | 1/2006 | Carr et al. | |
| 2006/0206861 A1 | 9/2006 | Shenfield et al. | |
| 2007/0129928 A1* | 6/2007 | Lin et al. | 703/17 |
| 2007/0239505 A1 | 10/2007 | Shukla et al. | |
| 2008/0155299 A1* | 6/2008 | Vertes et al. | 713/600 |
| 2011/0029977 A1* | 2/2011 | Ramanathaiah et al. | 718/102 |
| 2012/0166234 A1 | 6/2012 | Drittler et al. | |
| 2012/0215583 A1* | 8/2012 | Kunti et al. | 705/7.27 |
| 2012/0311609 A1 | 12/2012 | Taylor et al. | |

OTHER PUBLICATIONS

Hilerio, Israel, "Deploy Distributed Business Processes with Windows Workflow and Web Services", Published on: Oct. 2006, Available at: msdn.microsoft.com/en-us/magazine/cc163538.aspx.

* cited by examiner

*Primary Examiner* — Tammy Lee
(74) *Attorney, Agent, or Firm* — Kevin Sullivan; Doug Barker; Micky Minhas

(57) ABSTRACT

Embodiments are directed to executing a workflow using a virtualized clock and to ensuring idempotency and correctness among workflow processes. In one scenario, a computer system a computer system determines that a workflow session has been initialized. The workflow session runs as a set of episodes, where each episode includes one or more pulses of work that are performed when triggered by an event. Each workflow session is processed according to a virtualized clock that keeps a virtual session time for the workflow session. The computer system receives an event that includes an indication of the time the event was generated, and then accesses the received event to determine which pulses of work are to be performed as part of a workflow session episode. The computer system then executes the determined pulses of work according to the virtual session time indicated by the virtualized clock.

20 Claims, 5 Drawing Sheets

CONSISTENT MODELING AND EXECUTION OF TIME CONSTRUCTS IN BUSINESS PROCESSES

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email. In some cases, software applications include, or are designed to execute workflows. These workflows may include pulses of work which, when executed as part of the workflow, complete a specified task. Workflows may thus be used to perform a variety of different user-specified tasks.

BRIEF SUMMARY

Embodiments described herein are directed to executing a workflow using a virtualized clock and to ensuring idempotency and correctness among workflow processes. In one embodiment, a computer system determines that a workflow session has been initialized. The workflow session runs as a set of episodes, where each episode includes one or more pulses of work that are performed when triggered by an event. Each workflow session is processed according to a virtualized clock that keeps a virtual session time for the workflow session. The computer system receives an event that includes an indication of the time the event was generated, and then accesses the received event to determine which pulses of work are to be performed as part of a workflow session episode. The computer system then executes the determined pulses of work according to the virtual session time indicated by the virtualized clock.

In another embodiment, a computer system determines that a workflow session has been initialized, where the workflow session includes episodes that include pulses of work that are performed when triggered by an event. As in the embodiment above, each workflow session is processed according to a virtualized clock that keeps a virtual session time for the workflow session. The computer system receives an event that includes an indication of the time the event was generated, and then accesses the received event to determine which pulses of work are to be performed as part of a workflow session episode. The computer system determines the event generation time from the indication in the event, updates the virtual session time for the workflow session to the determined event generation time based on the timestamp included in the event, and executes the specified pulses of work according to the updated virtual session time indicated by the virtualized clock.

In yet another embodiment, a computer system performs a method for ensuring idempotency among workflow processes. The computer system instantiates a workflow session which includes episodes. Each episode includes pulses of work that are performed when triggered by an event, each workflow session being processed according to a virtualized clock that keeps a virtual time for the workflow session. The computer system next determines that some of the work pulses have initiated side-process that are to be completed as part of the work pulses. The computer system batches up the side-processes to create a batch of side-processes that are part of the workflow session, persists the current virtual time and an indication of those side-processes that are part of the batch of side-processes, and initiates processing of the batch of side-processes. The updated time of the virtualized session clock is also updated when the indication of the side-processes is persisted.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
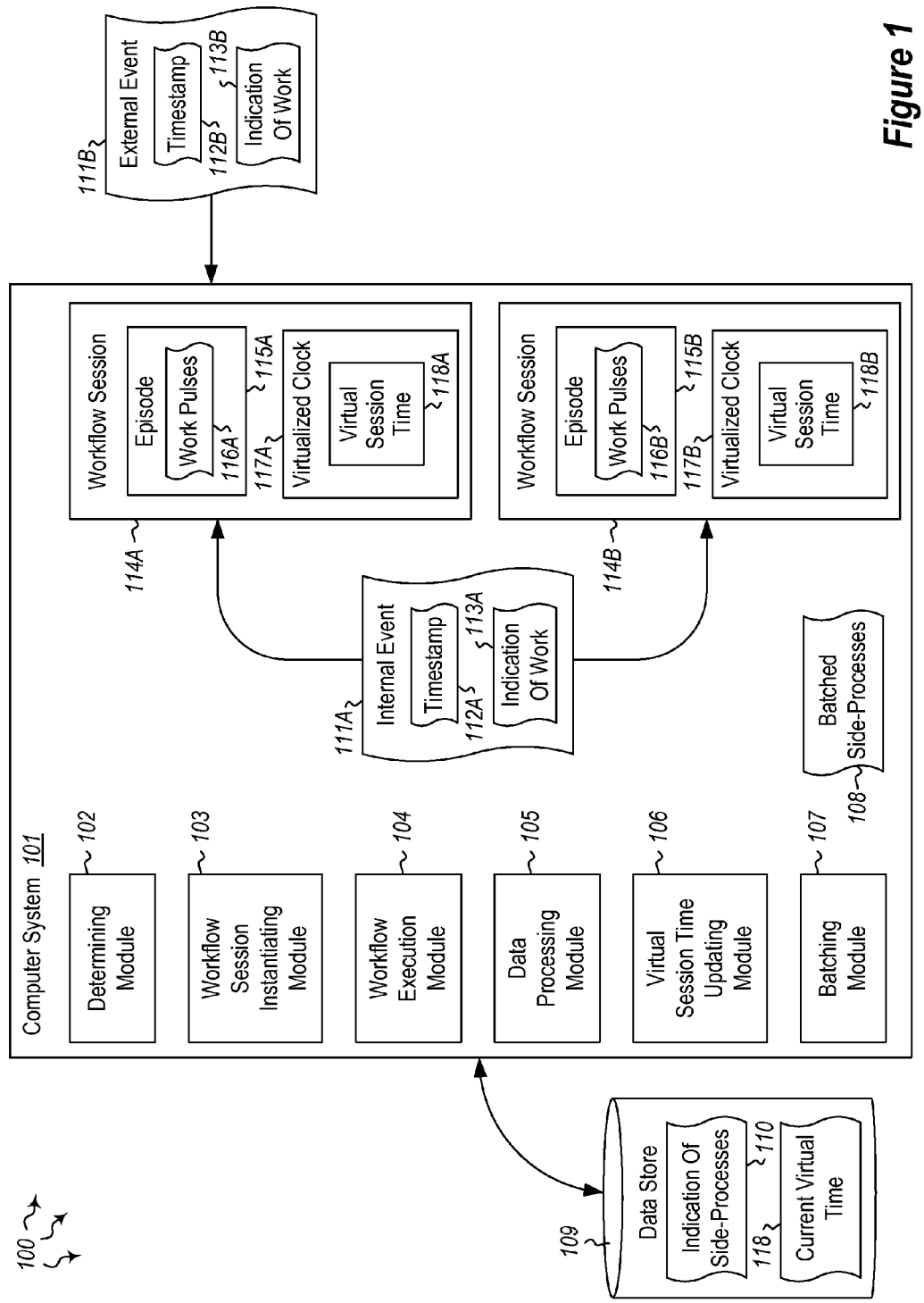
FIG. 1 illustrates a computer architecture in which embodiments described herein may operate including executing a workflow using a virtualized clock.

Embodiments described herein are directed to executing a workflow using a virtualized clock and to ensuring idempotency and correctness among workflow processes. In one embodiment, a computer system determines that a workflow session has been initialized. The workflow session runs as a set of episodes, where each episode includes one or more pulses of work that are performed when triggered by an event. Each workflow session is processed according to a virtualized clock that keeps a virtual session time for the workflow session. The computer system receives an event that includes an indication of the time the event was generated, and then accesses the received event to determine which pulses of work are to be performed as part of a workflow session episode. The computer system then executes the determined pulses of work according to the virtual session time indicated by the virtualized clock.

In another embodiment, a computer system determines that a workflow session has been initialized, where the workflow session includes episodes that include pulses of work that are performed when triggered by an event. As in the embodiment above, each workflow session is processed according to a virtualized clock that keeps a virtual session time for the workflow session. The computer system receives an event that includes an indication of the time the event was generated, and then accesses the received event to determine which pulses of work are to be performed as part of a workflow session episode. The computer system determines the event generation time from the indication in the event, updates the virtual session time for the workflow session to the determined event generation time based on the timestamp included in the event, and executes the specified pulses of work according to the updated virtual session time indicated by the virtualized clock.

In yet another embodiment, a computer system performs a method for ensuring idempotency among workflow processes. The computer system instantiates a workflow session which includes episodes. Each episode includes pulses of work that are performed when triggered by an event, each workflow session being processed according to a virtualized clock that keeps a virtual time for the workflow session. The computer system next determines that some of the work pulses have initiated side-process that are to be completed as part of the work pulses. The computer system batches up the side-processes to create a batch of side-processes that are part of the workflow session, persists the current virtual time and an indication of those side-processes that are part of the batch of side-processes, and initiates processing of the batch of side-processes. The updated time of the virtualized session clock is also updated when the indication of the side-processes is persisted.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer system 101 may be any type of local or distributed computer system, including a cloud computing system. The computer system includes modules for performing a variety of different functions. For instance, the workflow session instantiating module 103 of computer system 101 may be used to instantiate workflow session 114A and/or workflow session 114B. The workflow sessions may include various episodes 115A/115B, each of which includes one or more pulses of work 116A/116B. These pulses of work, when executed, accomplish some goal or task intended by the workflow, as part of the workflow session 114A.

Each pulse of work 116A is triggered by an incoming stimulus referred to herein as an event (e.g. internal event 111A or external event 111B). Accompanying the event is a notion of the time the event was generated (as indicated by timestamp 112A/112B). The term "event generation time", as used herein, refers to the time the event was generated in reference to the world's commonly agreed-to time (i.e. Greenwich Mean Time). As the timestamps 112A/112B report the current event generation time (in computer system 101's time zone, for example), the virtualized session time 118A/118B may be updated, as will be explained further below. Each episode 115A is one of potentially many episodes that occur over the course of the workflow session's lifetime. This lifetime can span days, months, or even years. Each episode of execution is a logical continuation of the previous episode's execution. An episode continues executing until each outstanding control flow path of the workflow instance is idle (i.e. waiting on more input). At this point, the workflow session state may be persisted in, for example, data store 109. Data store 109 may be any type of local or distributed data store.

The episodes and work pulses of a workflow session may trigger additional processes referred to herein as "side-effecting work" or "side-processes". For example, side-processes such as outbound messaging or database operations may be initiated by the computer system 101. When the workflow session is idle, the effects of the side-processes are persisted with the workflow state in data store 109. When persistence completes, the side-effecting work may be flushed. This avoids "ghost-writes," where a side-effect is triggered by the workflow, but the workflow is restarted in a state prior to the side-effect being generated. Ghost-writes are undesirable in cases where the workflow logic does not produce repeatable data for a side-effecting operation. Once the side-effecting work has succeeded, the workflow state is updated with this information and the workflow moves back into an idle "wait for event" stage.

At least in some embodiments, each episode (e.g. 115A) may be associated with a particular date and time. This date and time is determined by the workflow session's notion of time (i.e. virtual session time 118A/118B), which may differ from the event generation time. This virtual session time is maintained, for each workflow session, by the virtualized clock (e.g. 117A/117B). The virtual session time only moves forward when a message or event is received that has a timestamp in the future (relative to the virtual session time of the previous episode). When such occurs, the virtual session time is updated to the timestamp of the incoming stimulus (i.e. internal event 111A or external event 111B). This allows users to model time-dependent conditions in their workflows without having to worry about delays in processing from temporally decoupled, queued messages.

For example, if a user has implemented a voting workflow that processes incoming votes with a cut-off time of 5 pm, the user expects that a vote submitted at 4:59 PM will be accepted, regardless of when the workflow actually receives and processes it. As a result, local, internal messages (e.g. 111A) do not move the virtual session time 118A forward; however, external messages (e.g. 111B) will roll the virtual session time forward if the timestamp on the external message is earlier than the current workflow session time. Thus, episodes or work pulses that refer to time (e.g. operations to get the current time, delay for a specified amount of time, or delay until a specified time) are designed to refer to the virtual session time 118A. If work pulses need to be repeated, the incoming event will be replayed along with its original timestamp. As such, the current time of the workflow session 114A remains the same across retries of event processing and is thus resilient to process failovers and transient errors. These concepts will be explained further below with regard to methods 200 and 300 of FIGS. 2 and 3, respectively.

Figure 2:
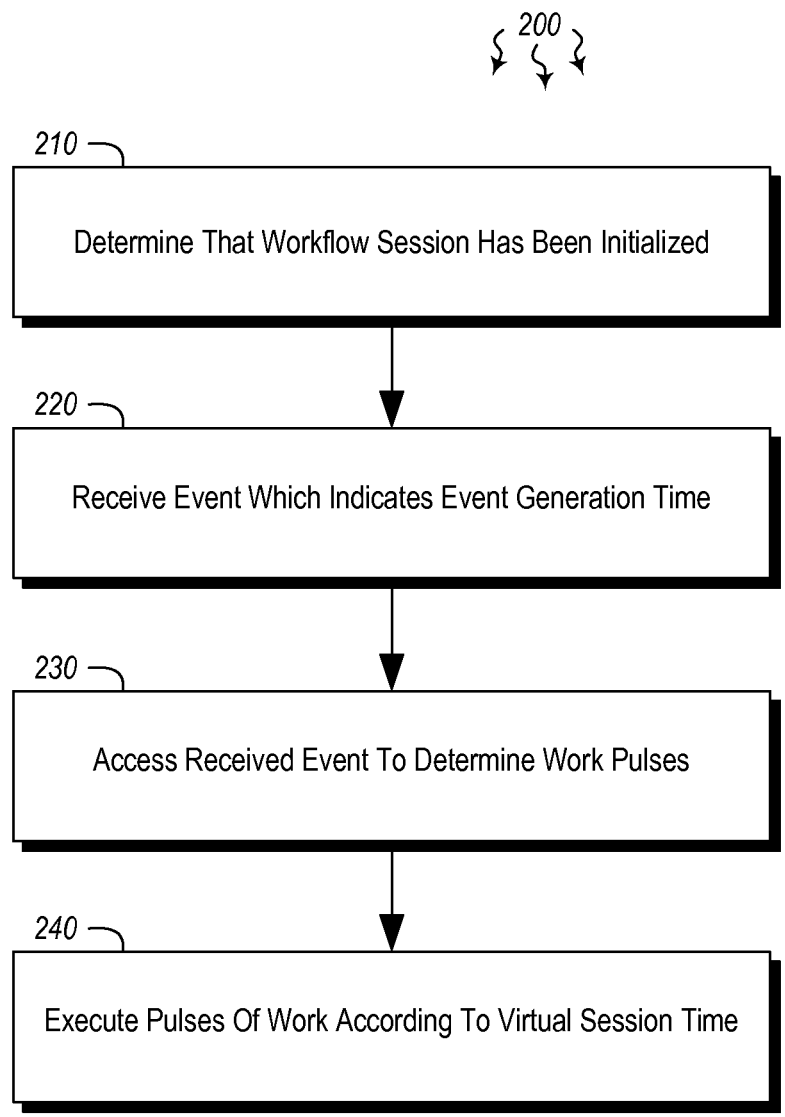
FIG. 2 illustrates a flowchart of an example method for executing a workflow using a virtualized clock.
Figure 3:
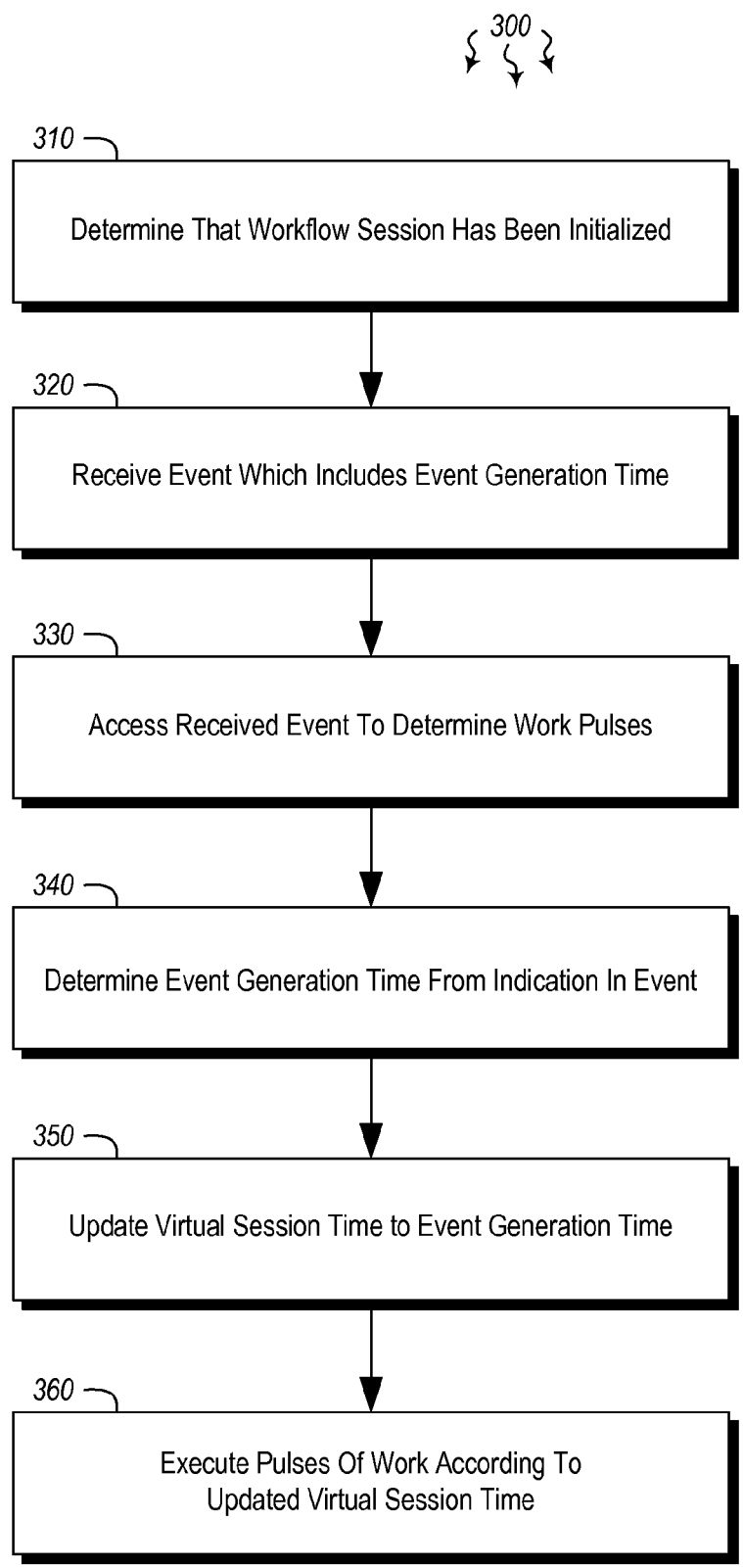
FIG. 3 illustrates a flowchart of an alternative example method for executing a workflow using a virtualized clock.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for executing a workflow using a virtualized clock. The method 200 will now be described with frequent reference to the components and data of environment 100.

Method 200 includes an act of determining that a workflow session has been initialized, the workflow session including one or more episodes, each episode comprising a pulse of work that is performed when triggered by an event, each workflow session being processed according to a virtualized clock that keeps a virtual session time for the workflow session (act 210). For example, determining module 102 of computer system 101 may determine that workflow session 114A has been established. The workflow session may be a long-running workflow session that has been running for months or years, or may be a workflow that just been established (or anywhere in between). The workflow session 114A includes episode 115A (along with any other episodes), episode 115A having one or more work pulses 116A. Each pulse of work may complete a specific task or execute a specific function. The work pulses complete these tasks using virtual session time 118A which is maintained by virtualized clock 117A. The virtual session time may be substantially any time, and does not have to be the current time or even related to the current global time. Each workflow session may thus maintain its own separate notion of time as kept by the workflow session's virtual clock 117A.

Method 200 also includes an act of receiving an event, the event including an indication of the time the event was generated (act 220) and, and further includes an act of accessing the received event to determine which one or more pulses of work are to be performed as part of a workflow session episode (act 230). The event may be an internal event (e.g. 111A) or an external event (e.g. 111B). The external event is sent from a computer system or workflow process outside of computer system 101. Internal events may be sent between workflow sessions or may be received from other processes or modules within computer system 101. For example, workflow session 114A may receive an internal event 111A from workflow session 114B. Similarly, workflow session 114A may send internal events to other workflow sessions such as 114B. The events include timestamps 112A/112B indicating the event's time of generation. The events also include indications of work that is to be performed by the receiving workflow session. The indication of work 113A/113B may specify work pulses that are to be initiated or episodes that are to be triggered by the event. In some cases, a workflow session may receive any of the following as events or in addition to events: a queued message, a subscription, a hyper-text transfer protocol (HTTP) response and/or a database connection response.

Method 200 further includes an act of executing the one or more specified pulses of work according to the virtual session time indicated by the virtualized clock (act 240). For example, workflow execution module 104 of computer system 101 may execute work pulses 116A of workflow session 114 according to the virtual session time 118A maintained by the virtual clock 117A. When the work pulses query for time or perform an action based on time (such as delaying until a specified time, or delaying a specified amount of time), the time used by the work pulses will be the virtual time 118A.

In some cases, the workflow session 114A may execute business processes. These business processes executed by the workflow session episodes may be deterministic, meaning that for a given set of business process inputs, the same outputs will be returned, regardless of when the inputs are processed. In this manner, transactions or processes that are only to be processed in a certain way are processed in that way. The execution of these business processes may be triggered by an event (e.g. 111A or 111B). The event may be received by the workflow session 114A. The event may include an indication 113A/113B indicating that a specified action has taken place (or is to take place), thereby triggering one or more work pulses. The event also includes a timestamp 112A/112B of the time the event was generated, which is used by the virtual session time updating module 106 to update the virtual session time 118A/118B according to the time indicated on the event's timestamp.

Once the triggered pulses of work have been executed, the workflow session state may be persisted. The data persisting module 105 may determine which state or other data is to be persisted, and may store it in data store 109. In some cases, the workflow session state is persisted before any side-effecting work is done. For example, if a workflow session is designed to debit a bank account as a side-process, the actual debit transaction is not performed immediately. The process may be initiated, but if it were to stop, it may not know whether it had performed the debit or not. As such, the process would be initiated and the workflow state would be persisted to show that the side-process was started. Then, once the process was complete, the state may be updated to show that the side-process was completed successfully. Side-processes triggered by the execution of a specified pulse of work may be delayed until the data associated with the work pulses has been persisted. Additionally or alternatively, transmission of the data associated with the work pulses may be delayed until the data has been persisted. Thus, in such cases, only data that has been persisted is transmitted.

In some embodiments, side-effecting work pulses may be batched together for batch processing. The batching module 107, for instance, may combine multiple side-processes together into a batch 108 for batch processing. As with the above example, batched, side-effecting work pulses may also be delayed until a notation has been recorded (e.g. 110) indicating that the batch of side-effecting work pulses is pending. This indication ensures that the batch of side-processes will not be lost if the workflow session somehow stalls or quits. In this manner, side-processes may be managed and batched in conjunction with the workflows of the respective workflow sessions 114A and/or 114B.

FIG. 3 illustrates a flowchart of a method 300 for executing a workflow using a virtualized clock. The method 300 will now be described with frequent reference to the components and data of environment 100.

Method 300 includes an act of determining that a workflow session has been initialized, the workflow session including one or more episodes, each episode comprising a pulse of work that is performed when triggered by an event, each workflow session being processed according to a virtualized clock that keeps a virtual session time for the workflow session (act 310). The workflow sessions 114A/114B may be executed in continuation-based runtime or any other type of runtime such as an asynchronous business processing runtime. Method 300 also includes an act of receiving an event, the event including an indication of the time the event was generated (act 320), and further includes an act of accessing the received event to determine which one or more pulses of work are to be performed as part of a workflow session episode (act 330). Method 300 also includes an act of determining the event generation time from the indication in the event (act 340), an act of updating the virtual session time for the workflow session to the determined event generation time based on the timestamp included in the event (act 350), and an act of executing the one or more specified pulses of work according to the updated virtual session time indicated by the virtualized clock (act 360).

Figure 5:
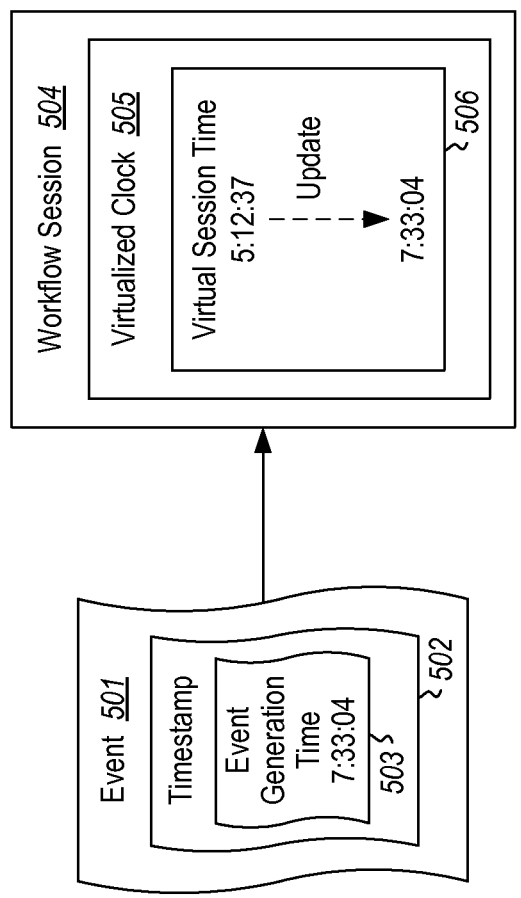
FIG. 5 illustrates an embodiment in which a workflow session is executed using a virtualized clock.

Thus, as shown in FIG. 5, a workflow session 504 may receive an event such as an event 501 from another workflow session or from another computing system. The event 501 includes a timestamp 502 of when the event occurred or when the event was generated. The event also includes an indication of work that has already been done or is to be performed by one or more of the work pulses of the workflow session 504. The determining module 102 of FIG. 1 may determine the event generation time 503 from the timestamp 502. The virtual session time updating module 106 of FIG. 1 may then update the virtual session time 506 from what it was previously (e.g. 5:12:37) to the event's generation time 503 (e.g. 7:33:04). The work indicated by the events may then be performed according to the updated virtual session time 506, as maintained by the virtualized clock 505.

As such, session queries for the current time return the virtual session time 506, indicating the session's virtualized notion of time. In some cases, processing of the specified pulses of work may be delayed until a specified absolute global time, or may be delayed for a specified amount of absolute global time. In such cases, timestamps would be used to determine the current global time, and then processing would be delayed until that time or delayed that amount of time.

At least in some embodiments, this execution of specified work pulses according to the updated virtual time 506 indicated by the virtualized clock 505 can prevent ghost writing from occurring. The execution of work pulses according to the virtual time enables idempotency (as will be explained further with regard to FIG. 4 below. Idempotency ensures that even if a work pulse or function is called multiple times, the function is only processed once; alternatively, idempotency ensures that even if the function is run multiple times, it only has the effect of being run once, and is therefore consistent across all function calls.

Figure 4:
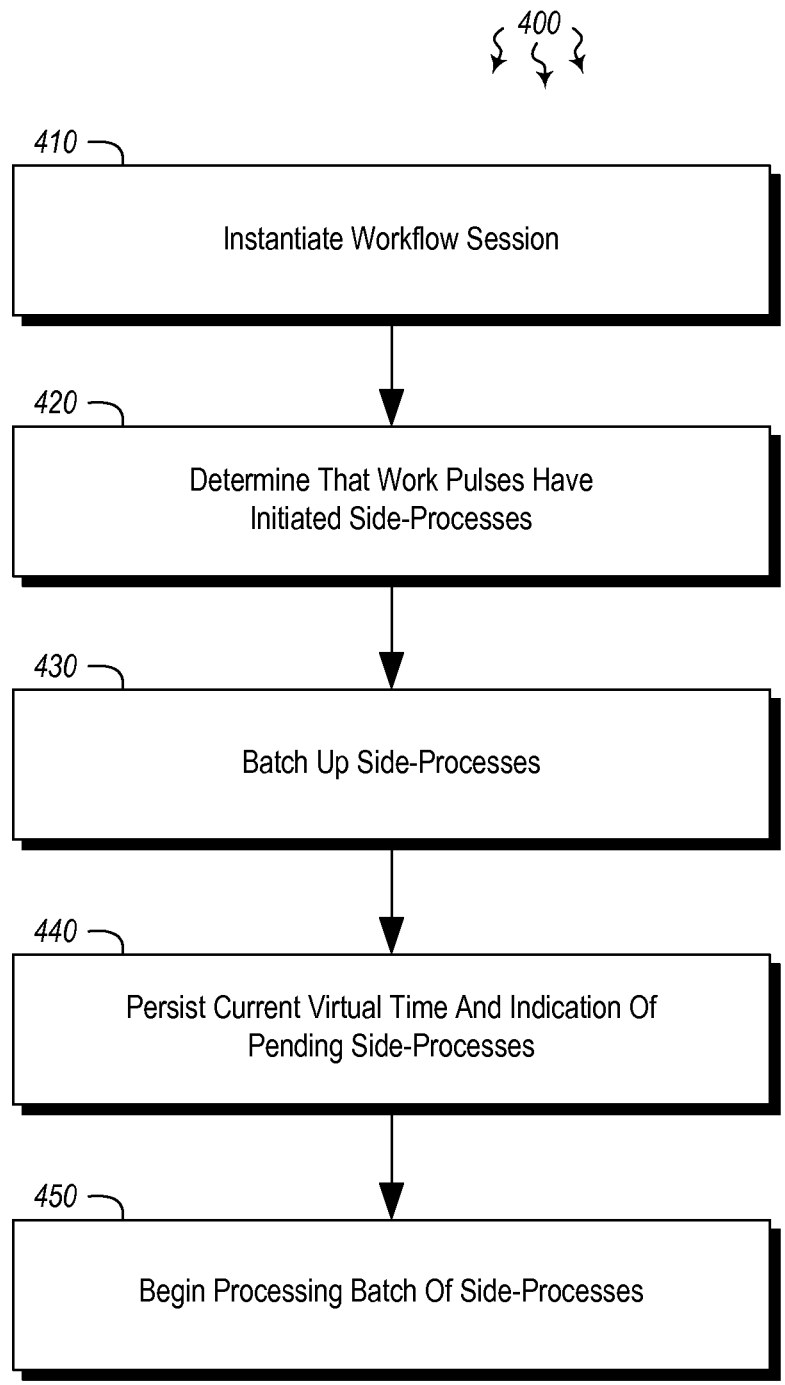
FIG. 4 illustrates a flowchart of an example method for ensuring idempotency among workflow processes.

FIG. 4 illustrates a flowchart of a method 400 for ensuring idempotency among workflow processes. The method 400 will now be described with frequent reference to the components and data of environment 100.

Method 400 includes an act of instantiating at least one workflow session, the workflow session including one or more episodes, each episode comprising a pulse of work that is performed when triggered by an event, each workflow session being processed according to a virtualized clock that keeps a virtual time for the workflow session (act 410). Method 400 next includes an act of determining that at least one of the work pulses has initiated one or more side-process that are to be completed as part of the work pulses (act 420). Method 400 further includes an act of batching up the one or more side-processes to create a batch of side-processes that are part of the workflow session (act 430), an act of persisting the current virtual time and an indication of those side-processes that are part of the batch of side-processes (act 440), and an act of initiating processing of the batch of side-processes (act 450).

These side-processes 108 may thus be processed once an indication of those side-processes 110 has been persisted in data store 109. Workflow state for the side-processes and/or for the workflow session 114A may also be stored/updated when the batch of side-processes has completed. By processing the work pulses according to a virtualized clock, and by storing indications of pending side-processes before they are processed, the processes of computer system 101 can ensure idempotency within the system. As each episode and work pulse is processed at a virtualized time that is maintained separately for each workflow session, each work pulse will only be processed once, thereby ensuring deterministic outcomes for each workflow session.

Accordingly, methods, systems and computer program products are provided which execute workflows using a virtualized clock. Moreover, methods, systems and computer program products are provided which ensure idempotency among workflow processes.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer system comprising the following:
one or more processors;
system memory; and
one or more computer-readable storage media having stored thereon computer-executable instructions that are executable by the one or more processors to configure the computer system to execute a workflow using a virtualized clock, the computer-executable instructions including instructions that are executable to configure the computer system to perform at least the following:
    determine that a workflow session has been initialized, the workflow session including one or more episodes, each episode comprising a pulse of work that is performed when triggered by an event, each workflow session being processed according to a virtualized clock that keeps a virtual session time for the workflow session, wherein receipt of an external message moves the virtualized clock forward if a timestamp on the external message is later than the current workflow session time, while receipt of local messages does not adjust the virtualized clock;
    receive an event, the event including an indication of the time the event was generated;
    access the received event to determine which one or more pulses of work are to be performed as part of a workflow session episode; and
    execute the one or more specified pulses of work according to the virtual session time indicated by the virtualized clock.

2. The computer system of claim 1, wherein business processes executed by the workflow session episodes are deterministic, such that business process inputs have the same outputs, regardless of when the inputs are processed.

3. The computer system of claim 1, wherein each workflow session has its own separate notion of time maintained by that workflow session's virtual clock.

4. The computer system of claim 1, the computer-executable instructions also including instructions that are executable to configure the computer system to:
    receive an event indicating that a specified action has taken place, the event including a timestamp of the time the event was generated; and
    adjust the virtual session time according to the time indicated on the event's timestamp.

5. The computer system of claim 1, the computer-executable instructions also including instructions that are executable to configure the computer system to persist one or more portions of data resulting from the specified pulses of work to a data store.

6. The computer system of claim 5, wherein side-processes triggered by the execution of the specified pulses of work are delayed until the data associated with the work pulses has been persisted.

7. The computer system of claim 5, wherein transmission of the data generated by the work pulses is delayed until the data has been persisted.

8. The computer system of claim 1, wherein side-processes triggered by the execution of the specified pulses of work are batched together for batch processing.

9. The computer system of claim 8, wherein the batched, side-processes are delayed until a notation has been recorded in a data store indicating that the batch of side-processes is pending.

10. The computer system of claim 1, wherein workflow sessions are processed as part of an asynchronous business processing runtime.

11. The computer system of claim 1, wherein executing the one or more specified pulses of work according to the updated virtual time indicated by the virtualized clock avoids ghost writing.

12. A method, implemented at a computer system that includes one or more processors, for executing a workflow using a virtualized clock, the method comprising:
    determining that a workflow session has been initialized, the workflow session including one or more episodes, each episode comprising a pulse of work that is performed when triggered by an event, each workflow session being processed according to a virtualized clock that keeps a virtual session time for the workflow session;
    receiving an event, the event including an indication of the time the event was generated;
    accessing the received event to determine which one or more pulses of work are to be performed as part of a workflow session episode; and
    executing the one or more specified pulses of work according to the virtual session time indicated by the virtualized clock, wherein side-processes triggered by the execution of the specified pulses of work are batched together for batch processing, and wherein the batched, side-processes are delayed until a notation has been recorded in a data store indicating that the batch of side-processes is pending.

13. The method of claim 12, wherein executing the one or more specified pulses of work according to the updated virtual time indicated by the virtualized clock avoids ghost writing.

14. The method of claim 12, wherein workflow session is executed in a continuation-based runtime.

15. The method of claim 12, wherein the workflow receives as an input at least one of the following: a queued message, a subscription, a hyper-text transfer protocol (HTTP) response and a database connection response.

16. The method of claim 12, wherein session queries for the current time return the virtual session time, indicating the session's notion of time.

17. The method of claim 12, wherein processing of the one or more specified pulses of work is delayed until a specified time.

18. The method of claim 12, wherein processing of the one or more specified pulses of work is delayed for a specified amount of time.

19. A computer system comprising the following:
    one or more processors;
    system memory; and
    one or more computer-readable storage media having stored thereon computer-executable instructions that are executable by the one or more processors to configure the computer system to ensure idempotency among workflow processes, the computer-executable instructions including instructions that are executable to configure the computer system to perform at least the following:
        instantiate at least one workflow session, the workflow session including one or more episodes, each episode comprising a pulse of work that is performed when triggered by an event, each workflow session being processed according to a virtualized clock that keeps a virtual time for the workflow session;
        determine that at least one of the work pulses has initiated one or more side-process that are to be completed as part of the work pulses;
        batch up the one or more side-processes to create a batch of side-processes that are part of the workflow session;
        persist the current virtual time and an indication of those side-processes that are part of the batch of side-processes to a data store;
        initiate processing of the batch of side-processes; and
        persist one or more portions of workflow state to the data store upon determining that the batch of side-processes has completed processing, such that the workflow session's clock value is durably updated at the time of persistence of the one or more portions of workflow state.

20. The method of claim 12, further comprising:
    determining the event generation time from the indication in the event; and
    updating the virtual session time for the workflow session to the determined event generation time based on the timestamp included in the event, wherein executing the one or more specified pulses of work according to the virtual session time indicated by the virtualized clock comprises executing the one or more specified pulses of work according to the updated virtual session time indicated by the virtualized clock.

* * * * *